(12) United States Patent
Lyons et al.

(10) Patent No.: US 7,652,575 B2
(45) Date of Patent: Jan. 26, 2010

(54) MONITORING OF PACKAGES

(75) Inventors: Nicholas P Lyons, Sunnyvale, CA (US); Martha L Lyons, Sunnyvale, CA (US); Alan McReynolds, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 11/262,221

(22) Filed: Oct. 27, 2005

(65) Prior Publication Data

US 2007/0096906 A1    May 3, 2007

(51) Int. Cl.
*G08B 13/14* (2006.01)

(52) U.S. Cl. ............... 340/572.1; 340/572.4; 340/572.7; 340/505; 340/539.1; 340/568.1; 340/686.1; 340/825.69; 235/492

(58) Field of Classification Search ............... 340/572.1, 340/572.4, 505, 539.1, 539.19, 539.26, 540, 340/541, 568.2, 686.1, 825.69, 10.1, 10.3, 340/10.52, 572.7, 568.1, 571; 235/487, 492
See application file for complete search history.

(56) References Cited

U.S. PATENT DOCUMENTS

| | | | | |
|---|---|---|---|---|
| 5,461,385 A | * | 10/1995 | Armstrong | 342/42 |
| 5,537,105 A | * | 7/1996 | Marsh et al. | 340/10.32 |
| 6,050,622 A | * | 4/2000 | Gustafson | 292/307 R |
| 6,925,287 B2 | * | 8/2005 | Davie et al. | 455/41.1 |
| 7,034,689 B2 | * | 4/2006 | Teplitxky et al. | 340/572.7 |
| 7,176,796 B2 | * | 2/2007 | Chen et al. | 340/568.1 |
| 2003/0075608 A1 | * | 4/2003 | Atherton | 235/492 |
| 2005/0242957 A1 | * | 11/2005 | Lindsay et al. | 340/572.7 |
| 2005/0248455 A1 | * | 11/2005 | Pope et al. | 340/539.27 |

OTHER PUBLICATIONS

Koh Patent Application Publication (U.S. 2007/0069895) filed on Dec. 1, 2004.*

* cited by examiner

*Primary Examiner*—Hung T. Nguyen

(57) ABSTRACT

An aspect of the present invention is a method of monitoring a package. The method includes mounting a transponder on the package, the transponder having at least two signal transmission devices and emitting a first output signal configuration on the signal transmission devices when the integrity of the package is intact and emitting a second output signal configuration on the signal transmission devices if the integrity of the package has been compromised.

27 Claims, 6 Drawing Sheets

MONITORING OF PACKAGES

FIELD

This invention relates generally to the monitoring of packages and, more particularly, to a system for, and a method of, monitoring packages.

BACKGROUND

Package identifying transponders are used in supply chain logistics to track packages in the supply chain. A form of transponder increasingly being used is a radio frequency identification (RFID) tag which may be an active device or a passive device. The tag is attached to the package to be monitored and, generally, when interrogated by an interrogator, emits a response signal representative of the identity of the package to which the tag is attached.

It has been proposed to use RFID tags to monitor whether or not a package has been tampered with. With such an arrangement, the connection between the RFID chip and its antenna is broken when an attempt is made to gain unauthorized access to contents of the package so that, when the RFID tag is interrogated, there is no response to the interrogation signal. The lack of a response is meant to serve as an indication that tampering with the package has occurred.

There are two problems associated with such an arrangement. Firstly, it is a relatively simple procedure to re-establish the connection between the RFID chip and its antenna. Someone with nefarious intentions and who is aware of the arrangement could re-establish the connection so that, when the RFID tag is subsequently interrogated, it responds as it is supposed to.

Secondly, the connection between the RFID chip and its antenna may be broken for reasons other than tampering. An otherwise safe package may then be disposed of needlessly due to the failure to receive a response when interrogated.

SUMMARY

An aspect of the present invention is a method of monitoring a package. The method includes mounting a transponder on the package, the transponder having at least two signal transmission devices and emitting a first output signal configuration on the signal transmission devices when the integrity of the package is intact and emitting a second output signal configuration on the signal transmission devices if the integrity of the package has been compromised.

BRIEF DESCRIPTION OF THE DRAWINGS

FIG. 2b shows a schematic block diagram of a part of the transponder of FIG. 2a;

FIG. 3 shows a flow chart of a first embodiment of a method for monitoring a package using the transponder of FIG. 2a;

DETAILED DESCRIPTION OF EXEMPLARY EMBODIMENTS

Figure 1:
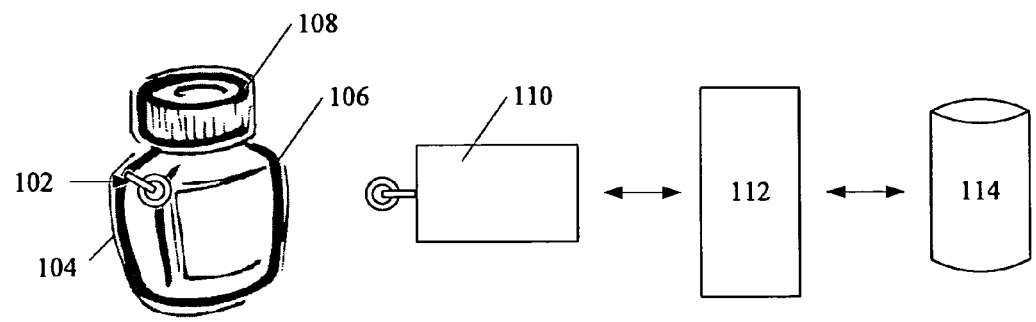
FIG. 1 shows a schematic, block diagram of a system, in accordance with an embodiment of the invention, for monitoring a package.

In FIG. 1 of the drawings, reference numeral 100 generally designates a system, in accordance with an embodiment, for monitoring a package. The system 100 incorporates a transponder in the form of an RFID tag 102 mounted on a package 104 such as, for example, a bottle of prescription medication. The package 104 includes a receptacle 106 and a closure member such as a screw cap 108.

The system 100 further includes a transceiver in the form of a tag reader 110. The tag reader 110 can either be a portable device or may be fixedly arranged on a structure such as a building, a vehicle, or the like. As the package 104 carrying the RFID tag 102 passes within a field of the reader 110, an identity code within the tag 102 is read. The tag reader emits an electric field via its antenna and uses its antenna as a signal reception device to monitor for a signal emitted by the tag 102.

In the case of a portable tag reader 110, it may be swept over packages to read the tags 102. Where the tag reader 110 is fixedly mounted, when the package passes within the field of the tag reader 110, the tag 102 of the package 104 is read.

The tag reader 110 communicates with a central control unit in the form of a computer 112 to which a database 114 is connected. Thus, when the tag reader 110 reads the code of the tag 102, this is communicated to the computer 112 which can determine, from accessing the database 114, the identity of the package 104.

Figure 2A:
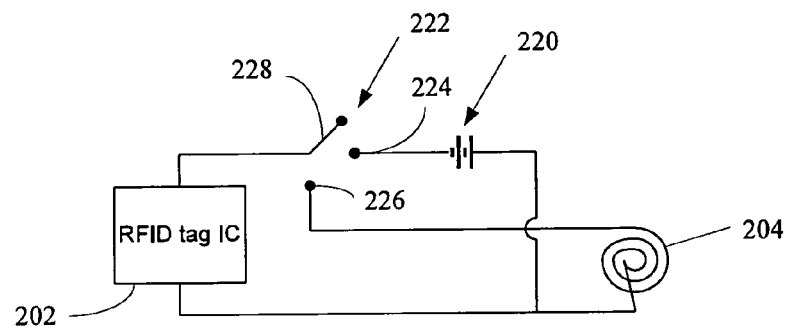
FIG. 2a shows a schematic block diagram of a first embodiment of a transponder for use with the system.

The system 100 is intended to detect tampering with packages 104. In FIG. 2a a first embodiment of an RFID tag 200 used in the system 100 is illustrated. The tag 200 includes an RFID tag integrated circuit (IC) or chip 202 in which an identity code is stored when the tag 200 is affixed to a package. The identity code stored in the IC 202 is able to be read by a transceiver (not shown in FIG. 2a) to determine the identity of the package. The IC 202 is connected to a signal transmission device in the form of an antenna 204.

Figure 2B:
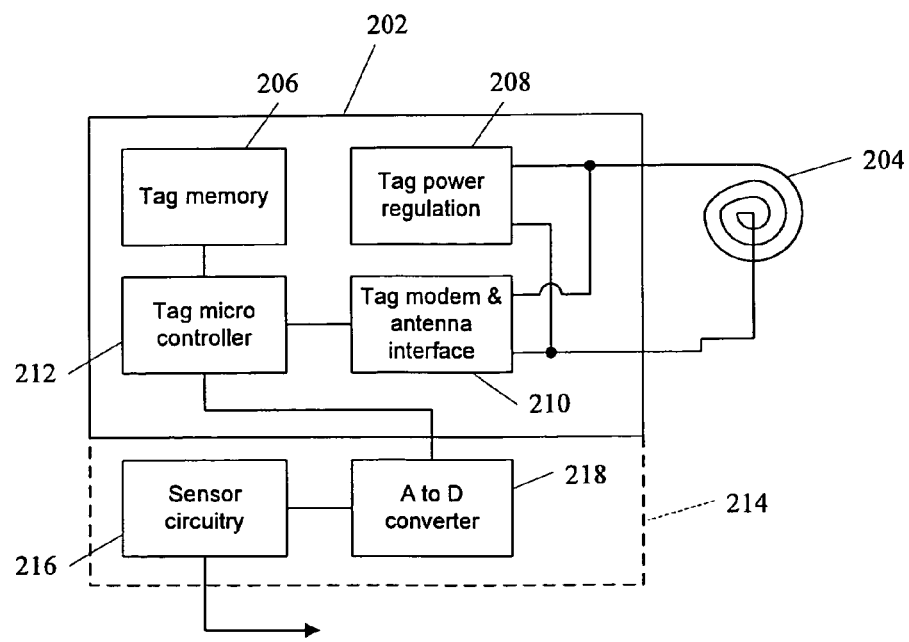

As shown in FIG. 2b of the drawings, the tag IC 202 includes a data storage module in the form of a tag memory 206 in which at least the identity code of the package is written. The tag 200 could be a passive device in which case the tag 200 does not have any power source and the only information contained in the tag memory is limited to the identity code and, possibly, a little information regarding the contents of the package.

The IC 202 further includes a power regulation module 208 for regulating power received from the antenna 204 in the case of a passive device. Further, the IC 202 includes a tag modem and antenna interface 210 and a microcontroller 212 controls the operation of the tag 200.

As will be described in greater detail below, the tag 200 could be used for sensing parameters or physical properties associated with the package. Thus, optionally, as illustrated by the dotted block 214, the tag IC 202 may include sensor circuitry 216 which receives signals from sensors monitoring the physical parameters or properties of the package. An output from the sensor circuitry 216 is fed via an analog to digital converter 218 to the microcontroller 212 of the IC 202.

In this embodiment, the tag 200 is an active device and includes a power source in the form of a battery 220. Further, the tag includes a switch 222 having a normally open contact 224 and a normally closed contact 226.

The power source 220 is a low cost power source and could, instead of the battery, be a piezoelectric effect supply or similar technology.

With the tag 200, under normal operating conditions, a switchable member 228 of the switch 222 engages the normally closed contact 226. When tampering with the package is detected, the switchable member 228 momentarily switches to the normally open contact 224 powering the IC 202 and allowing the IC 202 to record in its memory 206 that a connection to the tag antenna 204 has been momentarily broken. The tag memory 206 is then write protected.

Thus, if no tampering of the package has been detected during the passage of the package through the supply chain, when the tag 200 is interrogated it would emit a first response via the antenna 204. Conversely, if tampering with the package has been detected, a second, different response would be output from the antenna 204 when the tag 200 is interrogated. This second response contains information from the memory 206 that a tampering incident was detected. A user of the system is then able to take suitable action in respect of the package in respect of which there has been tampering.

Thus, the tag 200 is used as described below with reference to FIG. 3 of the drawings, where a method of monitoring a package, in accordance with this embodiment, is designated generally by the reference numeral 300. As an initial step, at 302, the manufacturer packages the product and sends it to a distributor. The distributor scans unopened packages using a tag reader which updates the distribution "pedigree" on the manufacturer website at step 304.

At step 306, a determination is made as to whether or not the package scans appropriately as unopened and authentic. If a negative answer is obtained, the package is voided and the manufacturer is informed. The package is removed from distribution as shown at step 308.

If an affirmative answer is received, then, as shown at step 310, larger lots of pallets, cases, boxes, etc of the packages are broken up into smaller collections of items. The smaller collections are shipped to retailers or consumers as shown at step 312.

At step 314 a further determination is made as to whether or not the integrity of the package is still intact. If the answer is no or shows that the package has been opened, step 308 applies as does step 316 which is to check the distribution pedigree to determine where interdiction occurred, if possible, in order to fix the process.

If an affirmative answer is received, then, at step 318 the package is put to its intended use, such as, for example, consuming its contents or on-selling the package.

Figure 4:
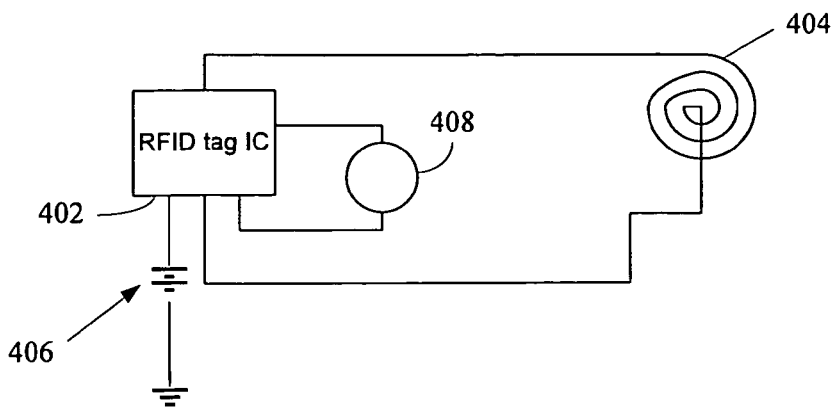
FIG. 4 shows a schematic block diagram of a second embodiment of a transponder for use with the system.

In FIG. 4 of the drawings, a tag 400 which monitors physical properties associated with the package or with the contents of the package includes a tag integrated circuit (IC) or chip 402 which communicates with a signal transmission device in the form of an antenna 404. The tag 400 is an active device and includes a power source such as a battery 406.

In this embodiment, the tag 400 includes a sensor 408 for monitoring the physical properties of the package or the contents of the package. Examples of the types of properties or parameters which could be sensed by the sensor 408 include temperature, pressure, light, radiation, impact, humidity, tilt, or the like. This is not an exhaustive list and other physical properties of the package or its contents could be monitored by an appropriate sensor 408. As an example, goods are often packaged in an evacuated container. Should a lid or closure cap of the container be removed, there would be an increase in pressure within the container. The sensor 408 could monitor such change in pressure.

While only a single sensor 408 has been illustrated, there could be a plurality of sensors connected to the tag IC 402, each sensor monitoring a different property or parameter of the package or its contents. Additionally, because the tag 400 is an active device, when the sensor 408 detects a change in the property or parameter being monitored, the event is written to the memory (not shown in this embodiment) of the IC 402.

In respect of the tag 400, if there has been no change in the physical property or parameter of the package during the passage of the package through the supply chain then, when the tag 400 is interrogated, a first response will be emitted via its antenna 404. Conversely, if there has been change in physical property associated with the package, for example, by the package having been tampered with, this change will be written from the sensor 408 to the memory of the integrated circuit 402.

In such circumstances, when the tag 400 is interrogated a second, different signal will be emitted from the antenna 404 of the tag 400. In so doing, an operator will be able to determine that the package has been tampered with and the appropriate action can then be taken.

Figure 5:
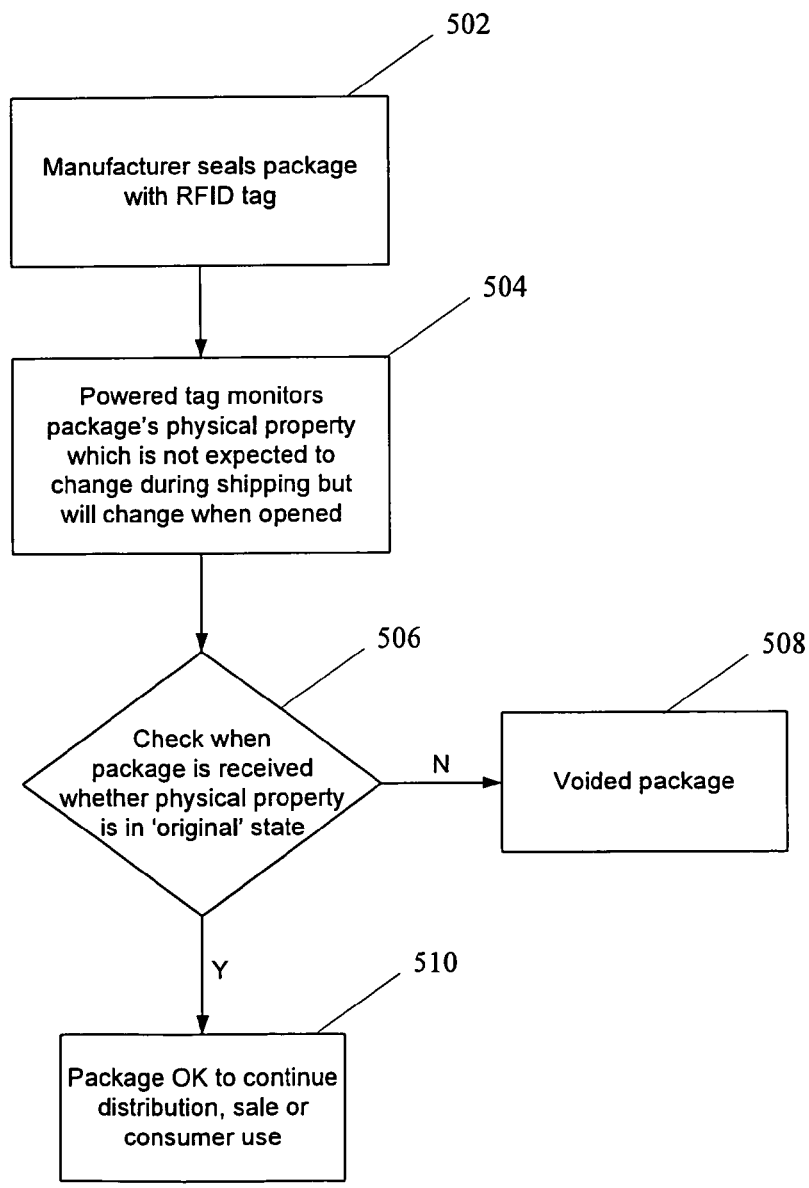
FIG. 5 shows a flow chart of a second embodiment of a method for monitoring a package using the transponder of FIG. 4.

Thus, a method of using the tag 400 is shown in FIG. 5 of the drawings and is designated generally by the reference numeral 500. As an initial step, at 502, the manufacturer seals the package with the tag. As shown at step 504, the powered tag monitors the physical property of the package which is not expected to change during shipping but which will change if the tag is tampered with, for example, by being opened in unauthorised circumstances.

When the package is received, a determination is made, as shown at step 506, whether the physical property is in its "original" state or not. If a negative answer is received, i.e. that the package has been tampered with and this is evident from the response received by the interrogator, the package is voided as shown at step 508. If an affirmative response is received, the package is deemed to be authentic and its integrity intact and the supply chain distribution, sale or consumption can proceed as shown at step 510.

Figure 6:
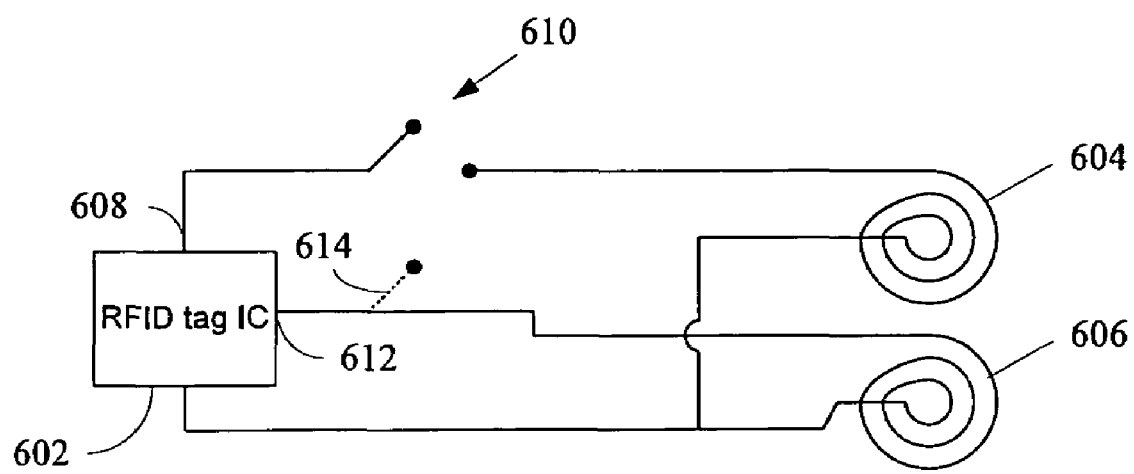
FIG. 6 shows a schematic block diagram of a third embodiment of a transponder for use with the system.

In FIG. 6 of the drawings, yet a further embodiment of a tag is illustrated and is designated generally by the reference numeral 600. The tag 600 includes a tag integrated circuit (IC) or chip 602. The tag further includes a first signal transmission device, or antenna, 604 and a second signal transmission device, or antenna, 606. The antenna 604 is connected to a first input 608 of the IC 602 via a normally closed switch 610. The second antenna 606 is connected to a second input 612 of the chip 602. The antenna 606 is connected to the input 612 directly or, optionally, via a normally open switch 614.

This tag 600 may be a passive device, excluding any form of power supply or, optionally, may also include a power supply (not shown) such as a battery. In this embodiment, when the package to which the tag 600 is attached remains unopened then, when the tag 600 is interrogated, a signal is emitted from the first antenna 604. If tampering with the package occurs, the antenna 604 is disabled. The second antenna 606 is then connected to the tag integrated circuit 602 and only operates after the first antenna 604 has been disabled. The second antenna 606, because it is connected to a different input 612, enables the tag IC 602 to distinguish when it is receiving a signal from the first antenna 604 and when it is receiving a signal from the second antenna 606. The tag IC 602, when it is interrogated, thus responds differently depending on which antenna 604 or 606 is connected to it.

This also allows the tag 600 to detect the state change before versus after the first time the package has been tampered with because the input which caused the tag IC 602 to be activated is known. Some tag ICs 602, even if passive, have a small amount of writable and protectable memory. The first time the second antenna 606 is powered without the first antenna sending a signal to the tag IC 602 can indicate that the package has been tampered with and this information can be stored on the tag IC 602. If the switch 614 is provided, this switch only closes when the package has been tampered with.

Figure 7:
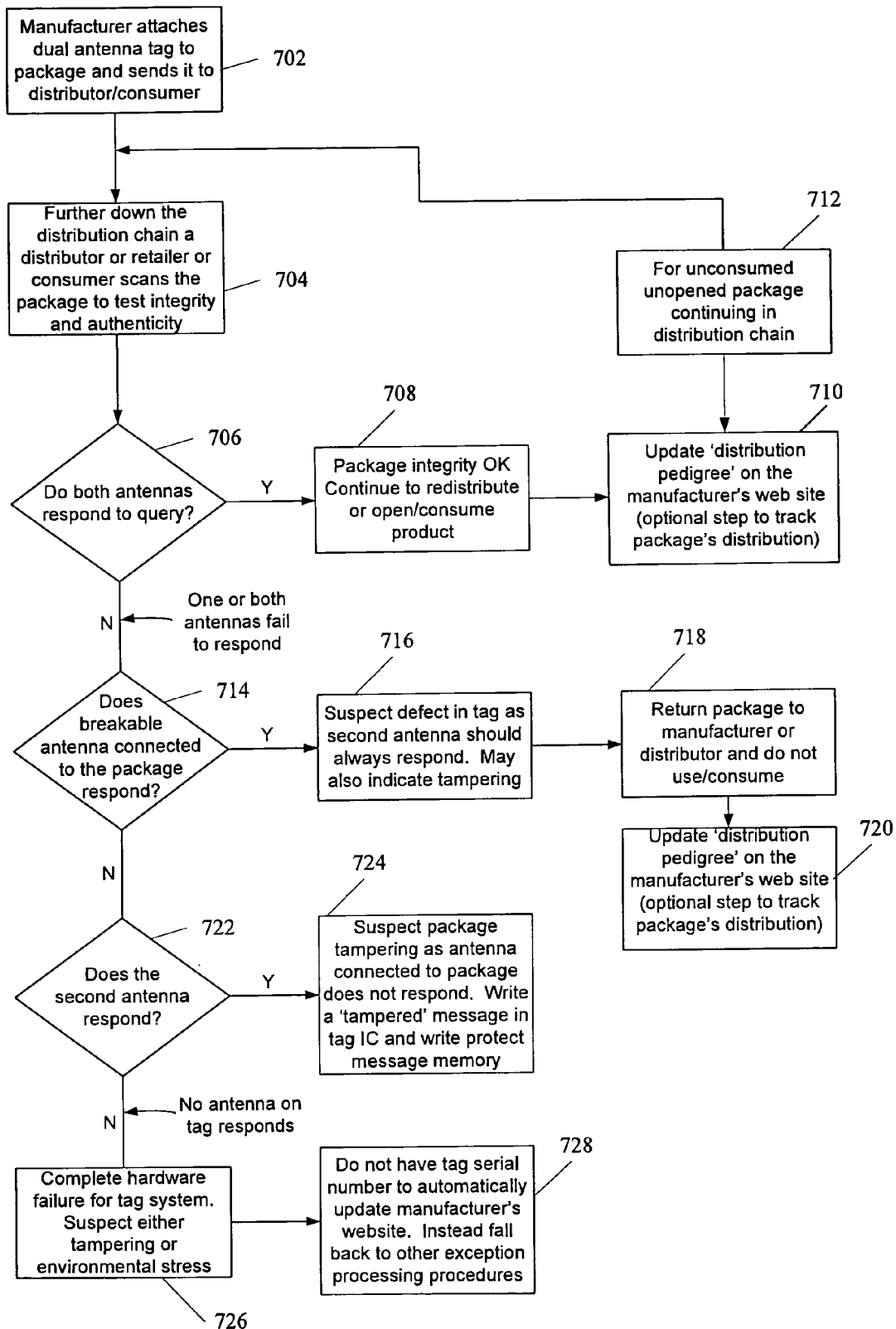
FIG. 7 shows a flow chart of a third embodiment for monitoring a package using the transponder of FIG. 6.

In FIG. 7 of the drawings a variation of the use of the tag 600 is shown and its method of operation is designated generally by the reference numeral 700.

In an initial step 702, the manufacturer attaches the tag to a package and sends it into the supply chain or distribution chain. Further down the distribution chain, as shown at step 704, a distributor, retailer or consumer scans the package to test its integrity and authenticity.

At step 706 a query is made as to whether or not both antennas respond to the query. If both antennas respond, a first output signal configuration is output from the package. This output signal configuration includes output signals from both antennas.

If the answer is in the affirmative, the package integrity is taken to be intact. The package continues in the distribution chain or is used as shown at step 708. A "distribution pedigree" is updated on the manufacturer's website, if desired, as shown at step 710. Unconsumed or unopened packages continue in the distribution chain as shown at step 712.

If both antennas do not respond to the query, a further query is made as to whether or not the breakable antenna (antenna 604) responded. This is shown at step 714. If the answer is in the affirmative, it is suspected that there is a defect in the tag as the second antenna (antenna 606) should always respond. This may also be an indication of tampering. At step 718, the package is returned to the manufacturer or distributor and is not used or consumed. Optionally, the "distribution pedigree" on the manufacturer's website is updated.

If the answer to the question at step 714 is in the negative, a further question is asked as to whether or not the second antenna responded. This is shown at step 722. If the answer is in the affirmative, it is suspected that there has been tampering with the package, as shown at step 724 as the first antenna did not respond. A "tampered" message is written to the memory of the tag IC and is write protected.

If the answer is in the negative then, as shown at step 726, it is assumed that there has been a complete hardware failure for the tag system. This may be evidence of tampering or environmental stress. Because the tag serial number (identity code) is not available to automatically update the manufacturer's website a fallback to other exception processing procedures occurs as shown at step 728.

Figure 8:
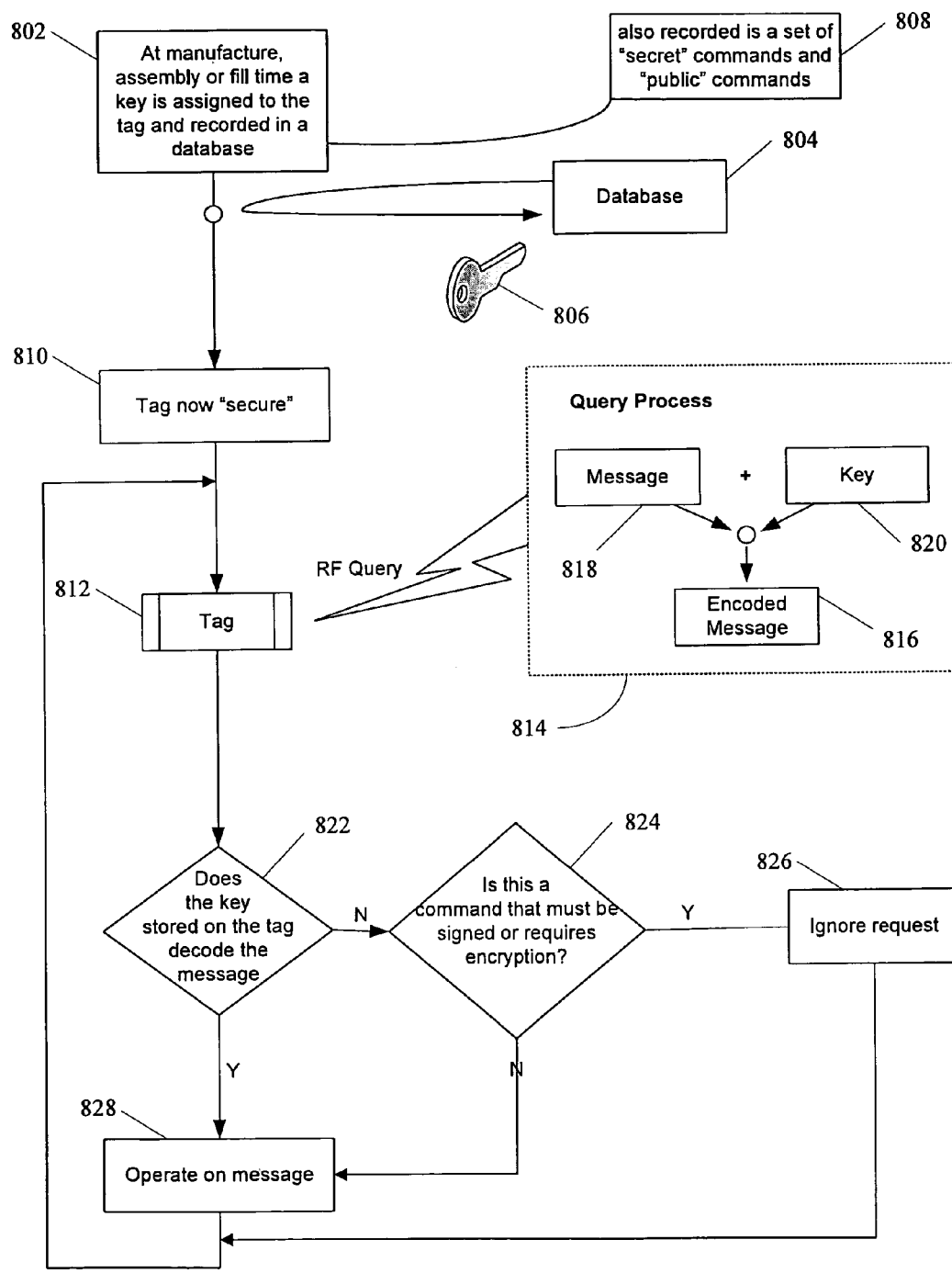
FIG. 8 shows a flow chart of a fourth embodiment of a method for monitoring a package.

A further variation of the method using the tag 600 is shown in FIG. 8 and is designated generally by the reference numeral 800. At step 802, at the time of manufacture, assembly or fill, an encryption key is assigned to the tag and is recorded in a database 804 (corresponding to the database 114 of FIG. 1). A set of secret commands and public commands are also recorded on the tag as shown at 808. Thus, as shown at step 810, the tag is now "secured".

When a secured tag 812 is interrogated by an interrogator 814 it is interrogated with an encoded message 816. The encoded message 816 contains a message string 818 which is encrypted with a key 820. When the tag 812 is interrogated, a determination is made, at step 822, as to whether or not the key 806 stored on the tag 812 decodes the message 818. If the answer is negative, a determination is made, at step 824, whether or not it is a request or command that needs to be signed or encrypted.

If the answer is yes, the request is ignored as shown at step 826. If the answer to the question asked at 822 is yes or the answer to the question 824 is no then, as shown at step 828, the message from the interrogator 814 is operated.

Thus the tag may conceal evidence of tampering from people who do not have the correct encryption codes. This is done by the tag ignoring any request that is not correctly encrypted. Instead, the tag may respond to most commands but ignore certain sensitive requests unless the request is properly encrypted with the correct code. If desired, the tag could also respond with a "not tampered" response to an incorrectly encrypted interrogation.

It is therefore an advantage of embodiments of the invention that systems and methods are provided which readily indicate when a package has been tampered with in a positive manner. In other words, rather than there being no response from the tag associated with the package, a second, different response is received indicating that there has been tampering. Hence, false indications of tampering are greatly reduced and the ability of unauthorized personnel to reconnect broken antennas will be ineffective due to prior storage of tamper evidence in the memory of an integrated circuit of the tag.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A system for monitoring a package, the system comprising:
    a transponder to be mounted on the package, the transponder comprising an integrated circuit including a data storage module, a first signal transmission device, and a second signal transmission device, the first signal transmission device being configured to emit a first output signal if the integrity of the package on which the transponder is mounted, is intact, the second signal transmission device configured to emit a second output signal, different from the first output signal, when the integrity of the package has been compromised; and
    a transceiver having a signal reception device for receiving at least one of the first output signal and the second output signal from the transponder.

2. The system of claim 1 in which the transponder is a radio frequency identification device (RFID) tag.

3. The system of claim 2 in which the RFID tag is an active device and includes a power source and a read/write memory component.

4. The system of claim 3 in which the RFID tag includes a sensor for sensing a predetermined parameter associated with one of the package and a contents of the package and for writing data to the memory component when a change in the parameter occurs.

5. The system of claim 2 in which the RFID tag has two signal transmission devices associated with its integrated circuit, wherein signals are emitted by the signal transmission devices, the signals being indicative of the integrity of the package.

6. The system of claim 5, wherein a determination is made regarding operation the two signal transmission devices, the determination including:
    in response to a determination that a first signal transmission device of the two signal transmission devices is operating properly and a second signal transmission device of the two signal transmission devices is not operating properly, taking a first action;

in response to a determination that the second signal transmission device is operating properly and the first signal transmission device is not operating properly, taking a second action;

in response to a determination both the first signal transmission device and the second signal transmission device are operating properly, taking a third action; and in response to a determination neither the first signal transmission device and the second signal transmission device are operating properly, taking a fourth action.

7. The system of claim 2 in which the transceiver is a tag interrogator.

8. The system of claim 7 which includes a central control unit with which the tag interrogator communicates, the control unit having a database associated with it.

9. A system for monitoring a package, the system comprising:
   a transponder to be mounted on the package, the transponder comprising an integrated circuit including a data storage module and at least two signal transmission devices, the transponder being configured to emit a first output signal configuration on the signal transmission devices if the integrity of the package on which the transponder is mounted, is intact and a second output signal configuration on the signal transmission devices if the integrity of the package has been compromised; and
   a transceiver having a signal reception device for receiving at least one of the first output signal configuration and the second output signal configuration from the transponder.

10. The system of claim 9 in which the transponder is a radio frequency identification device (RFID) tag.

11. The system of claim 10 in which the RFID tag is an active device and includes a power source and a read/write memory component.

12. The system of claim 11 in which the RFID tag includes a sensor for sensing a predetermined parameter associated with one of the package and a contents of the package and for writing data to the memory component when a change in the parameter occurs.

13. The system of claim 10 in which the transceiver is a tag interrogator.

14. The system of claim 13 which includes a central control unit with which the tag interrogator communicates, the control unit having a database associated with it.

15. A method of monitoring a package, the method comprising:
   mounting a transponder on the package, the transponder including a first signal transmission device and a second signal transmission device;
   causing the transponder to emit, via the first signal transmission device, a first output signal when the integrity of the package is intact; and
   causing the transponder to emit, via the first signal transmission device, a second output signal, different from the first output signal, when the integrity of the package has been compromised.

16. The method of claim 15 which includes implementing the transponder as an RFID tag and mounting the RFID tag in a predetermined location on or in the package.

17. The method of claim 16 which includes powering the tag with a power source and writing predetermined information to a memory of the tag.

18. The method of claim 17 which includes write protecting the memory after the information has been written to the memory and emitting the information from the memory when the tag is interrogated by an interrogator.

19. The method of claim 17 in which the tag has a sensor associated with it for sensing a parameter associated with one of the package and a contents of the package and in which the method includes writing information to the memory of the tag when a predetermined change in the parameter occurs.

20. The method of claim 16 which includes implementing the RFID tag with two signal transmission devices.

21. The method of claim 20 which includes emitting a first output signal configuration via the signal transmission devices when the integrity of the package is intact and emitting a second output signal configuration on the signal transmission devices if the integrity of the package has been compromised.

22. The method of claim 16 which includes interrogating the tag with an interrogator to cause the tag to emit at least one of the two output signals and comparing the output signal emitted with predetermined data stored in a database with which the interrogator is in communication.

23. A method of monitoring a package, the method comprising:
   mounting a transponder on the package, the transponder having at least two signal transmission devices;
   emitting a first output signal configuration on the signal transmission devices when the integrity of the package is intact; and
   emitting a second output signal configuration on the signal transmission devices if the integrity of the package has been compromised.

24. The method of claim 23 which includes implementing the transponder as an RFID tag and mounting the RFID tag in a predetermined location on or in the package.

25. The method of claim 24 which includes interrogating the tag with an interrogator to cause the tag to emit at least one of the two output signal configurations and comparing the output signal configuration emitted with predetermined data stored in a database with which the interrogator is in communication.

26. The method of claim 23 which includes powering the tag with a power source and writing predetermined information to a memory of the tag, which further includes write protecting the memory after the information has been written to the memory and transmitting the information from the memory when the tag is interrogated by an interrogator.

27. The method of claim 26 in which the tag has a sensor associated with it for sensing a parameter associated with one of the package and a contents of the package and in which the method includes writing information to the memory of the tag when a predetermined change in the parameter occurs.

* * * * *

UNITED STATES PATENT AND TRADEMARK OFFICE
CERTIFICATE OF CORRECTION

| | | |
|---|---|---|
| PATENT NO. | : 7,652,575 B2 | Page 1 of 1 |
| APPLICATION NO. | : 11/262221 | |
| DATED | : January 26, 2010 | |
| INVENTOR(S) | : Nicholas P Lyons et al. | |

It is certified that error appears in the above-identified patent and that said Letters Patent is hereby corrected as shown below:

On Sheet 1 of 6, in Fig. 1, add element number "100", above Figure.

On Sheet 1 of 6, in Fig. 2a, add element number "200", above Figure.

Figure 3:
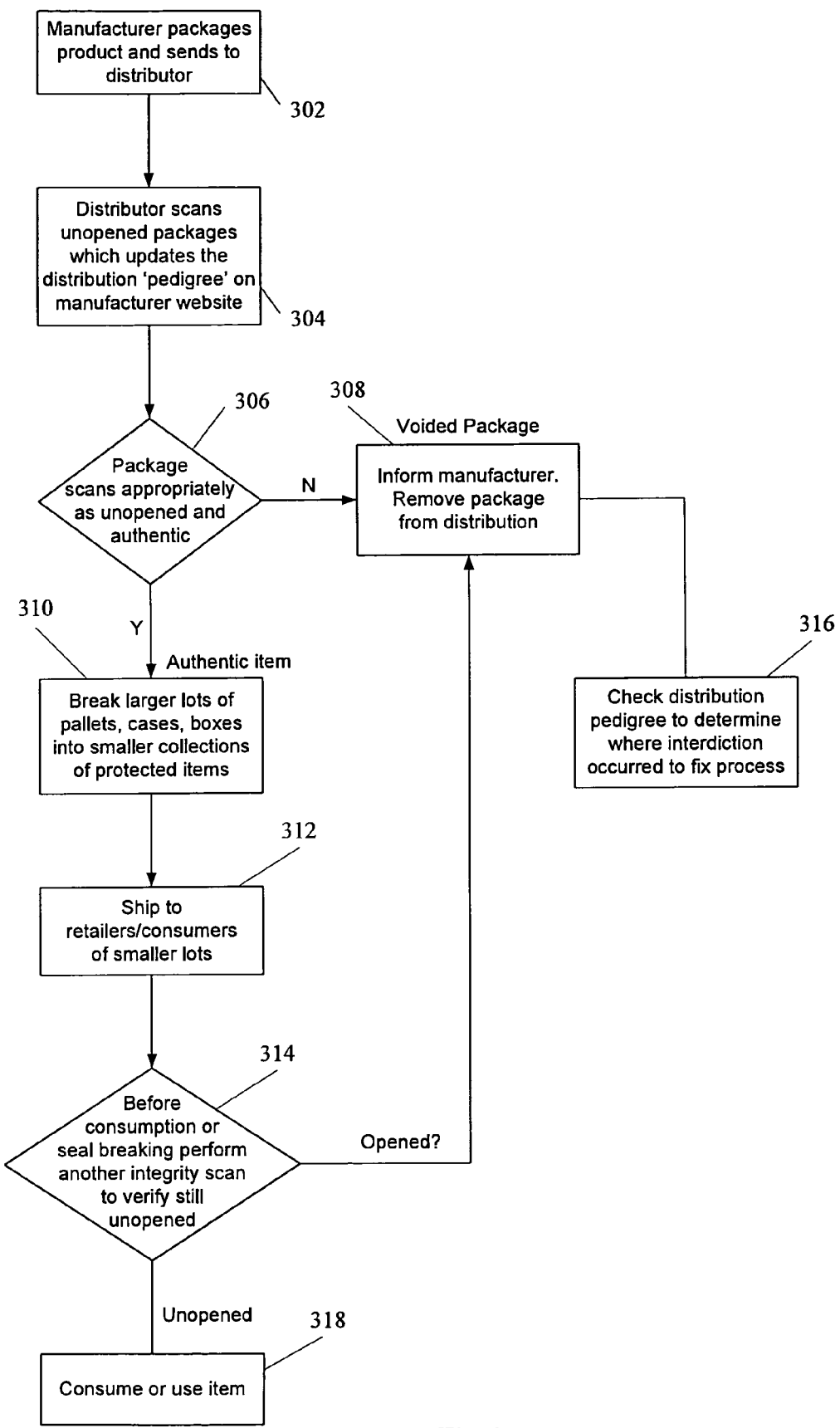

On Sheet 2 of 6, in Fig. 3, add element number "300", above Figure.

On Sheet 3 of 6, in Fig. 4, add element number "400", above Figure.

On Sheet 3 of 6, in Fig. 5, add element number "500", above Figure.

On Sheet 4 of 6, in Fig. 6, add element number "600", above Figure.

On Sheet 5 of 6, in Fig. 7, add element number "700", above Figure.

On Sheet 6 of 6, in Fig. 8, add element number "800", above Figure.

Signed and Sealed this
Seventh Day of June, 2011

David J. Kappos
*Director of the United States Patent and Trademark Office*